United States Patent
Gallivan

(10) Patent No.: US 8,650,190 B2
(45) Date of Patent: Feb. 11, 2014

(54) COMPUTER-IMPLEMENTED SYSTEM AND METHOD FOR GENERATING A DISPLAY OF DOCUMENT CLUSTERS

(71) Applicant: FTI Technology LLC, Annapolis, MD (US)

(72) Inventor: Dan Gallivan, Bainbridge Island, WA (US)

(73) Assignee: FTI Technology LLC, Annapolis, MD (US)

( * ) Notice: Subject to any disclaimer, the term of this patent is extended or adjusted under 35 U.S.C. 154(b) by 0 days.

(21) Appl. No.: 13/831,565

(22) Filed: Mar. 14, 2013

(65) Prior Publication Data

US 2013/0212098 A1    Aug. 15, 2013

Related U.S. Application Data

(63) Continuation of application No. 10/911,376, filed on Aug. 3, 2004, now Pat. No. 8,402,026, which is a continuation of application No. 09/943,918, filed on Aug. 31, 2001, now Pat. No. 6,778,995.

(51) Int. Cl.
*G06F 7/00* (2006.01)
*G06F 17/30* (2006.01)

(52) U.S. Cl.
USPC .......................................... 707/731; 707/739

(58) Field of Classification Search
None
See application file for complete search history.

(56) References Cited

U.S. PATENT DOCUMENTS

| | | |
|---|---|---|
| 3,416,150 A | 12/1968 | Lindberg |
| 3,426,210 A | 2/1969 | Agin |
| 3,668,658 A | 6/1972 | Flores et al. |
| 4,893,253 A | 1/1990 | Lodder |
| 5,056,021 A | 10/1991 | Ausborn |
| 5,121,338 A | 6/1992 | Lodder |

(Continued)

FOREIGN PATENT DOCUMENTS

| | | |
|---|---|---|
| EP | 1024437 | 8/2000 |
| EP | 1049030 | 11/2000 |
| EP | 0886227 | 10/2003 |
| WO | WO0067162 | 11/2000 |

OTHER PUBLICATIONS

Kazumasa Ozawa, "A Stratificational Overlapping Cluster Scheme," Information Science Center, Osaka Electro-Communication University, Neyagawa-shi, Osaka 572, Japan, Pattern Recognition, vol. 18, pp. 279-286 (1985).

(Continued)

*Primary Examiner* — Cheryl Lewis
*Assistant Examiner* — Raheem Hoffler
(74) *Attorney, Agent, or Firm* — Patrick J. S. Inouye; Krista A. Wittman

(57) ABSTRACT

A computer-implemented system and method for generating a display of document clusters is described. Clusters of documents are presented in a multi-dimensional concept space. At least one document is selected from a collection of documents to be clusters. An angle θ of the document relative to a common origin of the multi-dimensional concept space is computed. The selected document is compared with each of the clusters. An angle σ from the common origin is determined for each cluster. A difference between the angle θ for the document and the angle σ for the cluster is determined. The difference is compared to the variance, and a new cluster is created when the difference exceeds the variance for all the clusters.

20 Claims, 11 Drawing Sheets

(56) References Cited

U.S. PATENT DOCUMENTS

| | | |
|---|---|---|
| 5,133,067 A | 7/1992 | Hara et al. |
| 5,278,980 A | 1/1994 | Pedersen et al. |
| 5,371,673 A | 12/1994 | Fan |
| 5,442,778 A | 8/1995 | Pedersen et al. |
| 5,477,451 A | 12/1995 | Brown et al. |
| 5,488,725 A | 1/1996 | Turtle et al. |
| 5,524,177 A | 6/1996 | Suzuoka |
| 5,528,735 A | 6/1996 | Strasnick et al. |
| 5,619,632 A | 4/1997 | Lamping et al. |
| 5,619,709 A | 4/1997 | Caid et al. |
| 5,635,929 A | 6/1997 | Rabowsky et al. |
| 5,649,193 A | 7/1997 | Sumita et al. |
| 5,675,819 A | 10/1997 | Schuetze |
| 5,696,962 A | 12/1997 | Kupiec |
| 5,737,734 A | 4/1998 | Schultz |
| 5,754,938 A | 5/1998 | Herz et al. |
| 5,794,236 A | 8/1998 | Mehrle |
| 5,799,276 A | 8/1998 | Komissarchik et al. |
| 5,819,258 A | 10/1998 | Vaithyanathan et al. |
| 5,842,203 A | 11/1998 | D'Elena et al. |
| 5,844,991 A | 12/1998 | Hochberg et al. |
| 5,857,179 A | 1/1999 | Vaithyanathan et al. |
| 5,860,136 A | 1/1999 | Fenner |
| 5,862,325 A | 1/1999 | Reed et al. |
| 5,864,846 A | 1/1999 | Voorhees et al. |
| 5,864,871 A | 1/1999 | Kitain et al. |
| 5,867,799 A | 2/1999 | Lang et al. |
| 5,870,740 A | 2/1999 | Rose et al. |
| 5,909,677 A | 6/1999 | Broder et al. |
| 5,915,024 A | 6/1999 | Kitaori et al. |
| 5,920,854 A | 7/1999 | Kirsch et al. |
| 5,924,105 A | 7/1999 | Punch et al. |
| 5,940,821 A | 8/1999 | Wical |
| 5,950,146 A | 9/1999 | Vapnik |
| 5,950,189 A | 9/1999 | Cohen et al. |
| 5,966,126 A | 10/1999 | Szabo |
| 5,987,446 A | 11/1999 | Corey et al. |
| 6,006,221 A | 12/1999 | Liddy et al. |
| 6,012,053 A | 1/2000 | Pant et al. |
| 6,026,397 A | 2/2000 | Sheppard |
| 6,038,574 A | 3/2000 | Pitkow et al. |
| 6,070,133 A | 5/2000 | Brewster et al. |
| 6,089,742 A | 7/2000 | Warmerdam et al. |
| 6,092,059 A | 7/2000 | Straforini et al. |
| 6,094,649 A | 7/2000 | Bowen et al. |
| 6,100,901 A | 8/2000 | Mohda et al. |
| 6,119,124 A | 9/2000 | Broder et al. |
| 6,122,628 A | 9/2000 | Castelli et al. |
| 6,137,499 A | 10/2000 | Tesler |
| 6,137,545 A | 10/2000 | Patel et al. |
| 6,137,911 A | 10/2000 | Zhilyaev |
| 6,148,102 A | 11/2000 | Stolin |
| 6,154,219 A | 11/2000 | Wiley et al. |
| 6,167,368 A | 12/2000 | Wacholder |
| 6,173,275 B1 | 1/2001 | Caid et al. |
| 6,202,064 B1 | 3/2001 | Julliard |
| 6,216,123 B1 | 4/2001 | Robertson et al. |
| 6,243,713 B1 | 6/2001 | Nelson et al. |
| 6,243,724 B1 | 6/2001 | Mander et al. |
| 6,260,038 B1 | 7/2001 | Martin et al. |
| 6,326,962 B1 | 12/2001 | Szabo |
| 6,338,062 B1 | 1/2002 | Liu |
| 6,345,243 B1 | 2/2002 | Clark |
| 6,349,296 B1 | 2/2002 | Broder et al. |
| 6,349,307 B1 | 2/2002 | Chen |
| 6,360,227 B1 | 3/2002 | Aggarwal et al. |
| 6,377,287 B1 | 4/2002 | Hao et al. |
| 6,381,601 B1 | 4/2002 | Fujiwara et al. |
| 6,389,433 B1 | 5/2002 | Bolonsky et al. |
| 6,389,436 B1 | 5/2002 | Chakrabarti et al. |
| 6,408,294 B1 | 6/2002 | Getchius et al. |
| 6,414,677 B1 | 7/2002 | Robertson et al. |
| 6,415,283 B1 | 7/2002 | Conklin |
| 6,418,431 B1 | 7/2002 | Mahajan et al. |
| 6,421,709 B1 | 7/2002 | McCormick et al. |
| 6,438,537 B1 | 8/2002 | Netz et al. |
| 6,438,564 B1 | 8/2002 | Morton et al. |
| 6,442,592 B1 | 8/2002 | Alumbaugh et al. |
| 6,446,061 B1 | 9/2002 | Doerre et al. |
| 6,449,612 B1 | 9/2002 | Bradley et al. |
| 6,453,327 B1 | 9/2002 | Nielsen |
| 6,460,034 B1 | 10/2002 | Wical |
| 6,470,307 B1 | 10/2002 | Turney |
| 6,480,843 B2 | 11/2002 | Li |
| 6,480,885 B1 | 11/2002 | Olivier |
| 6,484,168 B1 | 11/2002 | Pennock et al. |
| 6,484,196 B1 | 11/2002 | Maurille |
| 6,493,703 B1 | 12/2002 | Knight et al. |
| 6,496,822 B2 | 12/2002 | Rosenfelt et al. |
| 6,502,081 B1 | 12/2002 | Wiltshire et al. |
| 6,507,847 B1 | 1/2003 | Fleischman |
| 6,510,406 B1 | 1/2003 | Marchisio |
| 6,519,580 B1 | 2/2003 | Johnson et al. |
| 6,523,026 B1 | 2/2003 | Gillis |
| 6,523,063 B1 | 2/2003 | Miller et al. |
| 6,542,889 B1 | 4/2003 | Aggarwal et al. |
| 6,544,123 B1 | 4/2003 | Tanaka et al. |
| 6,549,957 B1 | 4/2003 | Hanson et al. |
| 6,560,597 B1 | 5/2003 | Dhillon et al. |
| 6,571,225 B1 | 5/2003 | Oles et al. |
| 6,584,564 B2 | 6/2003 | Olkin et al. |
| 6,594,658 B2 | 7/2003 | Woods |
| 6,598,054 B2 | 7/2003 | Schuetze et al. |
| 6,606,625 B1 | 8/2003 | Muslea et al. |
| 6,611,825 B1 | 8/2003 | Billheimer et al. |
| 6,628,304 B2 | 9/2003 | Mitchell et al. |
| 6,629,097 B1 | 9/2003 | Keith |
| 6,651,057 B1 | 11/2003 | Jin et al. |
| 6,654,739 B1 | 11/2003 | Apte et al. |
| 6,658,423 B1 | 12/2003 | Pugh et al. |
| 6,675,159 B1 | 1/2004 | Lin et al. |
| 6,675,164 B2 | 1/2004 | Kamath et al. |
| 6,678,705 B1 | 1/2004 | Berchtold et al. |
| 6,684,205 B1 | 1/2004 | Modha et al. |
| 6,697,998 B1 | 2/2004 | Damerau et al. |
| 6,701,305 B1 | 3/2004 | Holt et al. |
| 6,711,585 B1 | 3/2004 | Copperman et al. |
| 6,714,929 B1 | 3/2004 | Micaelian et al. |
| 6,735,578 B2 | 5/2004 | Shetty et al. |
| 6,738,759 B1 | 5/2004 | Wheeler et al. |
| 6,747,646 B2 | 6/2004 | Gueziec et al. |
| 6,751,628 B2 | 6/2004 | Coady |
| 6,757,646 B2 | 6/2004 | Marchisio |
| 6,778,995 B1 * | 8/2004 | Gallivan ............. 707/739 |
| 6,785,679 B1 | 8/2004 | Dane et al. |
| 6,804,665 B2 | 10/2004 | Kreulen et al. |
| 6,816,175 B1 | 11/2004 | Hamp et al. |
| 6,819,344 B2 | 11/2004 | Robbins |
| 6,823,333 B2 | 11/2004 | McGreevy |
| 6,841,321 B2 | 1/2005 | Matsumoto et al. |
| 6,862,710 B1 | 3/2005 | Marchisio |
| 6,879,332 B2 | 4/2005 | Decombe |
| 6,883,001 B2 | 4/2005 | Abe |
| 6,888,584 B2 | 5/2005 | Suzuki et al. |
| 6,915,308 B1 | 7/2005 | Evans et al. |
| 6,922,699 B2 | 7/2005 | Schuetze et al. |
| 6,941,325 B1 | 9/2005 | Benitez et al. |
| 6,970,881 B1 | 11/2005 | Mohan et al. |
| 6,978,419 B1 | 12/2005 | Kantrowitz |
| 6,990,238 B1 | 1/2006 | Saffer et al. |
| 7,003,551 B2 | 2/2006 | Malik |
| 7,013,435 B2 | 3/2006 | Gallo et al. |
| 7,020,645 B2 | 3/2006 | Bisbee et al. |
| 7,051,017 B2 | 5/2006 | Marchisio |
| 7,054,870 B2 | 5/2006 | Holbrook |
| 7,080,320 B2 | 7/2006 | Ono |
| 7,096,431 B2 | 8/2006 | Tambata et al. |
| 7,099,819 B2 | 8/2006 | Sakai et al. |
| 7,117,246 B2 | 10/2006 | Christenson et al. |
| 7,130,807 B1 | 10/2006 | Mikurak |
| 7,137,075 B2 | 11/2006 | Hoshino et al. |
| 7,155,668 B2 | 12/2006 | Holland et al. |
| 7,194,458 B1 | 3/2007 | Micaelian et al. |
| 7,194,483 B1 | 3/2007 | Mohan et al. |

(56) References Cited

U.S. PATENT DOCUMENTS

| | | | |
|---|---|---|---|
| 7,209,949 B2 | 4/2007 | Mousseau et al. | |
| 7,233,886 B2 | 6/2007 | Wegerich et al. | |
| 7,240,199 B2 | 7/2007 | Tomkow | |
| 7,251,637 B1 | 7/2007 | Caid et al. | |
| 7,266,365 B2 | 9/2007 | Ferguson et al. | |
| 7,266,545 B2 | 9/2007 | Bergman et al. | |
| 7,269,598 B2 | 9/2007 | Marchisio | |
| 7,277,919 B1 | 10/2007 | Donoho et al. | |
| 7,325,127 B2 | 1/2008 | Olkin et al. | |
| 7,353,204 B2 | 4/2008 | Liu | |
| 7,363,243 B2 | 4/2008 | Arnett et al. | |
| 7,366,759 B2 | 4/2008 | Trevithick et al. | |
| 7,379,913 B2 | 5/2008 | Steele et al. | |
| 7,383,282 B2 | 6/2008 | Whitehead et al. | |
| 7,401,087 B2 | 7/2008 | Copperman et al. | |
| 7,412,462 B2 | 8/2008 | Margolus et al. | |
| 7,418,397 B2 | 8/2008 | Kojima et al. | |
| 7,444,356 B2 | 10/2008 | Calistri-Yeh et al. | |
| 7,457,948 B1 | 11/2008 | Bilicksa et al. | |
| 7,490,092 B2 | 2/2009 | Morton et al. | |
| 7,571,177 B2 | 8/2009 | Damle | |
| 7,698,167 B2 | 4/2010 | Batham et al. | |
| 8,402,026 B2* | 3/2013 | Gallivan | 707/737 |
| 2002/0032735 A1 | 3/2002 | Burnstein et al. | |
| 2002/0065912 A1 | 5/2002 | Catchpole et al. | |
| 2002/0078090 A1 | 6/2002 | Hwang et al. | |
| 2002/0122543 A1 | 9/2002 | Rowen | |
| 2002/0184193 A1 | 12/2002 | Cohen | |
| 2003/0130991 A1 | 7/2003 | Reijerse et al. | |
| 2005/0171948 A1* | 8/2005 | Knight | 707/6 |

OTHER PUBLICATIONS

Bier et al. "Toolglass and Magic Lenses: The See-Through Interface", Computer Graphics Proceedings, Proceedings of Siggraph Annual International Conference on Computer Graphics and Interactive Techniques, pp. 73-80, XP000879378 (Aug. 1993).

Shuldberg et al., "Distilling Information from Text: The EDS TemplateFiller System," Journal of the American Society for Information Science, vol. 44, pp. 493-507 (1993).

Lam et al., "A Sliding Window Technique for Word Recognition," SPIE, vol. 2422, pp. 38-46, Center of Excellence for Document Analysis and Recognition, State University of New Yrok at Baffalo, NY, USA (1995).

Eades et al. "Multilevel Visualization of Clustered Graphs," Department of Computer Science and Software Engineering, University if Newcastle, Australia, Proceedings of Graph Drawing '96, Lecture Notes in Computer Science, NR. 1190, (Sep. 1996).

Eades et al., "Orthogonal Grid Drawing of Clustered Graphs," Department of Computer Science, the University of Newcastle, Australia, Technical Report 96-04, [Online] 1996, Retrieved from the internet: URL: http://citeseer.ist.psu.edu/eades96ort hogonal.html (1996).

http://em-ntserver.unl.edu/Math/mathweb/vecors/vectors.html © 1997.

North et al. "A Taxonomy of Multiple Window Coordinations," Institute for Systems Research & Department of Computer Science, University of Maryland, Maryland, USA, http://drum.lib.umd.edu/bitstream/1903/927/2/CS-TR-3854.pdf (1997).

Ryall et al., "An Interactive Constraint-Based System for Drawing Graphs," UIST '97 Proceedings of the 10th Annual ACM Symposium on User Interface Software and Technology, pp. 97-104 (1997).

Whiting et al., "Image Quantization: Statistics and Modeling," SPIE Conference of Physics of Medical Imaging, San Diego, CA, USA, vol. 3336, pp. 260-271 (Feb. 1998).

B.B. Hubbard, "The World According the Wavelet: The Story of a Mathematical Technique in the Making," AK Peters (2nd ed.), pp. 227-229, Massachusetts, USA (1998).

R.E. Horn, "Communication Units, Morphology, and Syntax," Visual Language: Global Communication for the 21st Century, 1998, Ch. 3, pp. 51-92, MacroVU Press, Bainbridge Island, Washington, USA (1998).

Miller et al., "Topic Islands: A Wavelet Based Text Visualization System," Proceedings of the IEEE Visualization Conference. 1998, pp. 189-196.

Fekete et al., "Excentric Labeling: Dynamic Neighborhood Labeling for Data Visualization," CHI 1999 Conference Proceedings Human Factors in Computing Systems, Pittsburgh, PA, pp. 512-519 (May 15-20, 1999).

Estivill-Castro et al. "Amoeba: Hierarchical Clustering Based on Spatial Proximity Using Delaunaty Diagram", Department of Computer Science, The University of Newcastle, Australia, 1999 ACM Sigmod International Conference on Management of Data, vol. 28, No. 2, Jun. 1999, pp. 49-60, Philadelphia, PA, USA (Jun. 1999).

Lio et al., "Funding Pathogenicity Islands and Gene Transfer Events in Genome Data," Bioinformatics, vol. 16, pp. 932-940, Department of Zoology, University of Cambridge, UK (Jan. 25, 2000).

Magarshak, Theory & Practice. Issue 01. May 17, 2000. http://www.flipcode.com/articles/tp.sub.--issue01-pf.shtml (May 17, 2000).

Kurimo, "Fast Latent Semantic Indexing of Spoken Documents by Using Self-Organizing Maps" IEEE International Conference on Accoustics, Speech, and Signal Processing, vol. 6, pp. 2425-2428 (Jun. 2000).

Davison et al., "Brute Force Estimation of the Number of Human Genes Using EST Clustering as a Measure," IBM Journal of Research & Development, vol. 45, pp. 439-447 (May 2001).

Anna Sachinopoulou, "Multidimensional Visualization," Technical Research Centre of Finland, ESPOO 2001, VTT Research Notes 2114, pp. 1-37 (2001).

Kohonen, "Self-Organizing Maps," Ch. 1-2, Springer-Verlag (3rd ed.) (2001).

Hiroyuki Kawano, "Overview of Mondou Web Search Engine Using Text Mining and Information Visualizing Technologies," IEEE, 2001, pp. 234-241.

James Osborn et al "Justice: A Judicial Search Tool Using Intelligent Concept Extraction," ICAIL-99, 1999, pp. 173-181, ACM.

Chen An et al "Fuzzy Concept Graph and Application in Web Document Clustering," 2001, pp. 101-106, IEEE.

F. Can., "Incremental Clustering for Dynamic Information Processing," ACM Transactions on Information Systems, vol. 11, No. 1, pp. 143-164 (Apr. 1993).

D. Sullivan, "Document Warehousing and Text Mining, Techniques for Improving Business Operations, Marketing, and Sales," Chs. 1-3, Wiley Computer Publishing (2001).

Linhui, Jiang, "K-Mean Algorithm: Iterative Partitioning Clustering Algorithm," http://www.cs.regina.ca/~linhui/K_mean_algorithm.html, (2001) Computer Science Department, University of Regina, Saskatchewan, Canada.

Kanungo et al., "The Analysis of a Simple K-Means Clustering Algorithm," pp. 100-109, Proc 16th annual symposium of computational geometry (May 2000).

Pelleg et al., "Accelerating Exact K-Means Algorithms With Geometric Reasoning," pp. 277-281, Conf on Knowledge Discovery in Data, Proc fifth ACM SIGKDD (1999).

Jain et al., "Data Clustering: A Review," vol. 31, No. 3, ACM Computing surveys, (Sep. 1999).

Baeza-Yates et al., "Modern Information Retrieval," Ch. 2 "Modeling," Modern Information Retrieval, Harlow: Addison-Wesley, Great Britain 1999, pp. 18-71 (1999).

Vance Faber: "Clustering and the Continuous K-Means Algorithm," Los Alamos Science, The Laboratory, Los Alamos, NM, US, No. 22, pp. 138-144 (Jan. 1, 1994).

* cited by examiner

| | | Concept₁ | Concept₂ | Concept₃ | Concept₄ | |
|---|---|---|---|---|---|---|
| 182 | Cluster₁ (184) | 5 | 5 | 5 | 5 | ← 183a |
| | Cluster₂ (185) | 10 | 10 | 0 | 0 | ← 183b |
| | Cluster₃ (186) | 0 | 0 | 10 | 10 | ← 183c |
| | . | | | | | |
| | Clusterₙ | 5 | 5 | 0 | 5 | ← 183d |

180, 181

COMPUTER-IMPLEMENTED SYSTEM AND METHOD FOR GENERATING A DISPLAY OF DOCUMENT CLUSTERS

CROSS-REFERENCE TO RELATED APPLICATIONS

This patent application is a continuation of U.S. patent application Ser. No. 10/911,376, filed Aug. 3, 2004, pending, which is a continuation of U.S. Pat. No. 6,778,995, issued Aug. 17, 2004, the priority dates of which are claimed and the disclosures of which is incorporated by reference.

FIELD OF THE INVENTION

The present invention relates in general to text mining and, in particular, to a system and method for efficiently generating document clusters.

BACKGROUND OF THE INVENTION

Document warehousing extends data warehousing to content mining and retrieval. Document warehousing attempts to extract semantic information from collections of unstructured documents to provide conceptual information with a high degree of precision and recall. Documents in a document warehouse share several properties. First, the documents lack a common structure or shared type. Second, semantically-related documents are integrated through text mining. Third, essential document features are extracted and explicitly stored as part of the document warehouse. Finally, documents are often retrieved from multiple and disparate sources, such as over the Internet or as electronic messages.

Document warehouses are built in stages to deal with a wide range of information sources. First, document sources are identified and documents are retrieved into a repository. For example, the document sources could be electronic messaging folders or Web content retrieved over the Internet. Once retrieved, the documents are pre-processed to format and regularize the information into a consistent manner. Next, during text analysis, text mining is performed to extract semantic content, including identifying dominant themes, extracting key features and summarizing the content. Finally, metadata is compiled from the semantic context to explicate essential attributes. Preferably, the metadata is provided in a format amenable to normalized queries, such as database management tools. Document warehousing is described in D. Sullivan, "Document Warehousing and Text Mining, Techniques for Improving Business Operations, Marketing, and Sales," Chs. 1-3, Wiley Computer Publishing (2001), the disclosure of which is incorporated by reference.

Text mining is at the core of the data warehousing process. Text mining involves the compiling, organizing and analyzing of document collections to support the delivery of targeted types of information and to discover relationships between relevant facts. However, identifying relevant content can be difficult. First, extracting relevant content requires a high degree of precision and recall. Precision is the measure of how well the documents returned in response to a query actually address the query criteria. Recall is the measure of what should have been returned by the query. Typically, the broader and less structured the documents, the lower the degree of precision and recall. Second, analyzing an unstructured document collection without the benefit of a priori knowledge in the form of keywords and indices can present a potentially intractable problem space. Finally, synonymy and polysemy can cloud and confuse extracted content. Synonymy refers to multiple words having the same meaning and polysemy refers to a single word with multiple meanings. Fine-grained text mining must reconcile synonymy and polysemy to yield meaningful results.

In particular, the transition from syntactic to semantic content analysis requires a shift in focus from the grammatical level to the meta level. At a syntactic level, documents are viewed structurally as sentences comprising individual terms and phrases. In contrast, at a semantic level, documents are viewed in terms of meaning. Terms and phrases are grouped into clusters representing individual concepts and themes.

Data clustering allows the concepts and themes to be developed more fully based on the extracted syntactic information. A balanced set of clusters reflects terms and phrases from every document in a document set. Each document may be included in one or more clusters. Conversely, concepts and themes are preferably distributed over a meaningful range of clusters.

Creating an initial set of clusters from a document set is crucial to properly visualizing the semantic content. Generally, a priori knowledge of semantic content is unavailable when forming clusters from unstructured documents. The difficulty of creating an initial clusters set is compounded when evaluating different types of documents, such as electronic mail (email) and word processing documents, particularly when included in the same document set.

In the prior art, several data clustering techniques are known. Exhaustive matching techniques fit each document into one of a pre-defined and fixed number of clusters using a closest-fit approach. However, this approach forces an arbitrary number of clusters onto a document set and can skew the meaning of the semantic content mined from the document set.

A related prior art clustering technique performs gap analysis in lieu of exhaustive matching. Gaps in the fit of points of data between successive passes are merged if necessary to form groups of documents into clusters. However, gap analysis is computational inefficient, as multiple passes through a data set are necessary to effectively find a settled set of clusters.

Therefore, there is a need for an approach to forming clusters of concepts and themes into groupings of classes with shared semantic meanings. Such an approach would preferably categorize concepts mined from a document set into clusters defined within a pre-specified range of variance. Moreover, such an approach would not require a priori knowledge of the data content.

SUMMARY OF THE INVENTION

The present invention provides a system and method for generating logical clusters of documents in a multi-dimensional concept space for modeling semantic meaning. Each document in a set of unstructured documents is first analyzed for syntactic content by extracting literal terms and phrases. The semantic content is then determined by modeling the extracted terms and phrases in multiple dimensions. Histograms of the frequency of occurrences of the terms and phrases in each document and over the entire document set are generated. Related documents are identified by finding highly correlated term and phrase pairings. These pairings are then used to calculate Euclidean distances between individual documents. Those documents corresponding to concepts separated by a Euclidean distance falling within a predetermined variance are grouped into clusters by k-means clustering. The remaining documents are grouped into new clusters. The clusters can be used to visualize the semantic content.

An embodiment of the present invention is a system and a method for building a multi-dimensional semantic concept space over a stored document collection. A plurality of documents within a stored document collection containing substantially correlated terms reflecting syntactic content are identified. A vector reflecting semantic similarities between substantially correlated documents at an angle θ from a common axis in a concept space is generated. One or more clusters are formed at an angle σ from the common axis in the concept space. Each cluster includes documents having such an angle θ falling within a predefined variance of the angle σ for the cluster. A new cluster is constructed at an angle σ from the common axis in the concept space. Each new cluster includes documents having such an angle θ falling outside the predefined variance of the angle σ for the remaining clusters.

A further embodiment provides a computer-implemented system and method for generating a display of document clusters. Clusters of documents are presented in a multi-dimensional concept space. At least one document is selected from a collection of documents to be clusters. An angle θ of the document relative to a common origin of the multi-dimensional concept space is computed. The selected document is compared with each of the clusters. An angle σ from the common origin is determined for each cluster. A difference between the angle θ for the document and the angle σ for the cluster is determined. The difference is compared to the variance, and a new cluster is created when the difference exceeds the variance for all the clusters.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Glossary

Keyword: A literal search term which is either present or absent from a document. Keywords are not used in the evaluation of documents as described herein.

Term: A root stem of a single word appearing in the body of at least one document.

Phrase: Two or more words co-occurring in the body of a document. A phrase can include stop words.

Concept: A collection of terms or phrases with common semantic meanings.

Theme: Two or more concepts with a common semantic meaning.

Cluster: All documents for a given concept or theme.

The foregoing terms are used throughout this document and, unless indicated otherwise, are assigned the meanings presented above.

Figure 1:
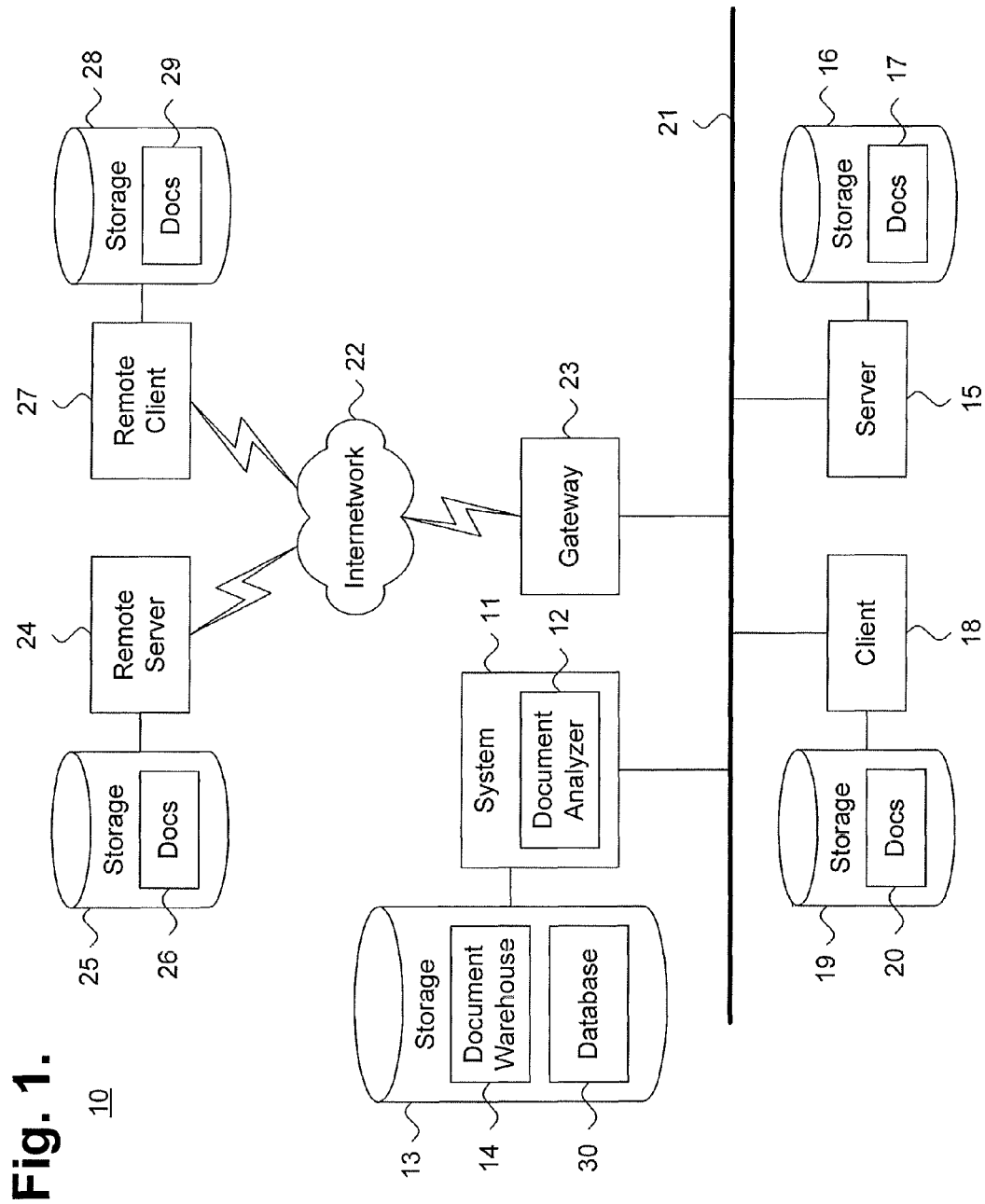
FIG. 1 is a block diagram showing a system for efficiently generating cluster groupings in a multi-dimensional concept space, in accordance with the present invention.

FIG. 1 is a block diagram showing a system 11 for efficiently generating cluster groupings in a multi-dimensional concept space, in accordance with the present invention. By way of illustration, the system 11 operates in a distributed computing environment 10, which includes a plurality of heterogeneous systems and document sources. The system 11 implements a document analyzer 12, as further described below beginning with reference to FIG. 2, for evaluating latent concepts in unstructured documents. The system 11 is coupled to a storage device 13, which stores a document warehouse 14 for maintaining a repository of documents and a database 30 for maintaining document information.

The document analyzer 12 analyzes documents retrieved from a plurality of local sources. The local sources include documents 17 maintained in a storage device 16 coupled to a local server 15 and documents 20 maintained in a storage device 19 coupled to a local client 18. The local server 15 and local client 18 are interconnected to the system 11 over an intranetwork 21. In addition, the document analyzer 12 can identify and retrieve documents from remote sources over an internetwork 22, including the Internet, through a gateway 23 interfaced to the intranetwork 21. The remote sources include documents 26 maintained in a storage device 25 coupled to a remote server 24 and documents 29 maintained in a storage device 28 coupled to a remote client 27.

The individual documents 17, 20, 26, 29 include all forms and types of unstructured data, including electronic message stores, such as electronic mail (email) folders, word processing documents or Hypertext documents, and could also include graphical or multimedia data. Notwithstanding, the documents could be in the form of structured data, such as stored in a spreadsheet or database. Content mined from these types of documents does not require preprocessing, as described below.

In the described embodiment, the individual documents 17, 20, 26, 29 include electronic message folders, such as maintained by the Outlook and Outlook Express products, licensed by Microsoft Corporation, Redmond, Wash. The database is an SQL-based relational database, such as the Oracle database management system, release 8, licensed by Oracle Corporation, Redwood Shores, Calif.

The individual computer systems, including system 11, server 15, client 18, remote server 24 and remote client 27, are general purpose, programmed digital computing devices consisting of a central processing unit (CPU), random access memory (RAM), non-volatile secondary storage, such as a hard drive or CD ROM drive, network interfaces, and peripheral devices, including user interfacing means, such as a keyboard and display. Program code, including software programs, and data are loaded into the RAM for execution and processing by the CPU and results are generated for display, output, transmittal, or storage.

Figure 2:
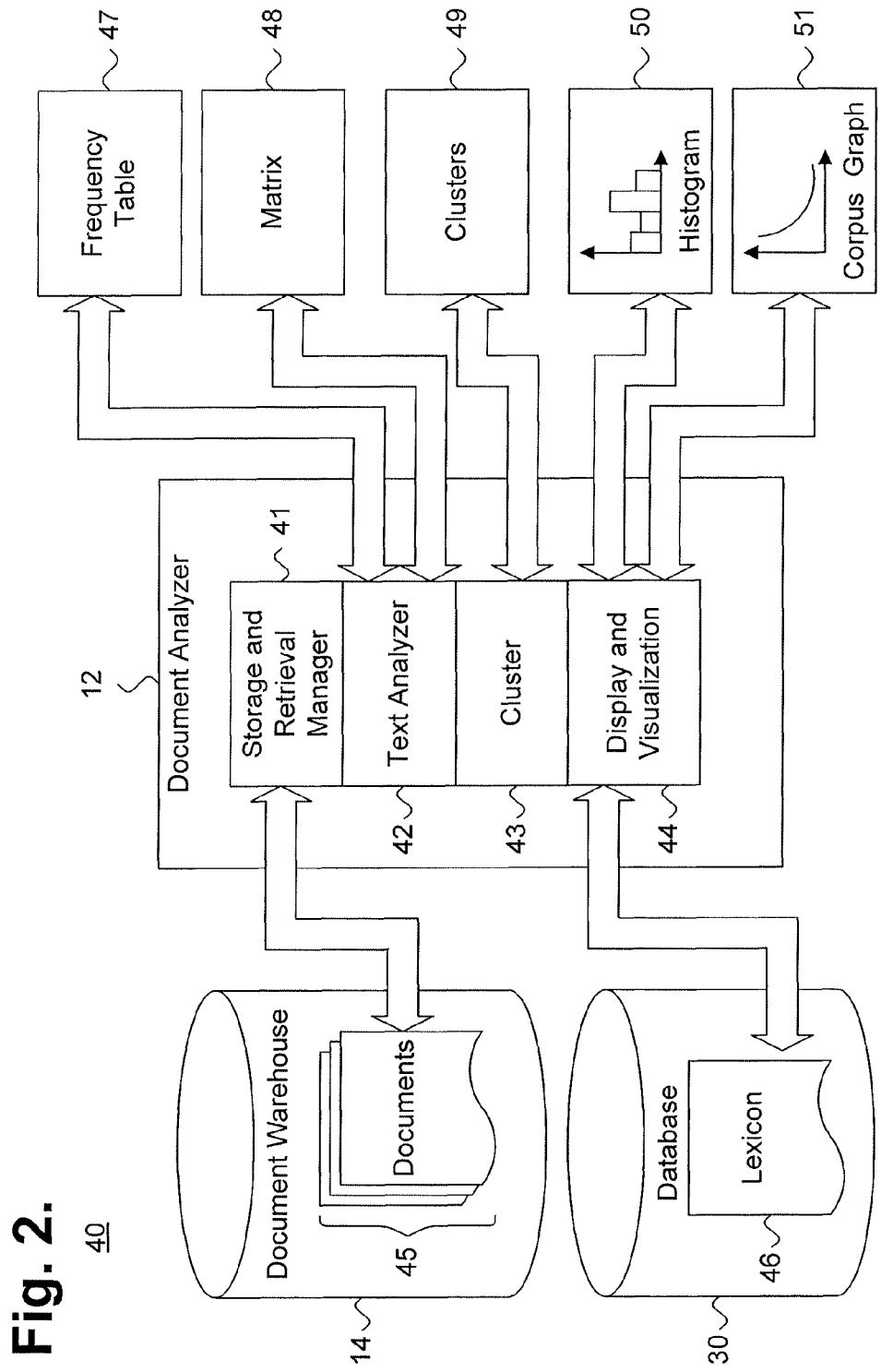
FIG. 2 is a block diagram showing the software modules implementing the document analyzer of FIG. 1.

FIG. 2 is a block diagram showing the software modules 40 implementing the document analyzer 12 of FIG. 1. The document analyzer 12 includes three modules: storage and retrieval manager 41, text analyzer 42, and display and visualization 44. The storage and retrieval manager 41 identifies and retrieves documents 45 into the document warehouse 14 (shown in FIG. 1). The documents 45 are retrieved from various sources, including both local and remote clients and server stores. The text analyzer 42 performs the bulk of the text mining processing. The cluster 43 generates clusters 49 of highly correlated documents, as further described below with reference to FIG. 12. The display and visualization 44 complements the operations performed by the text analyzer 42 by presenting visual representations of the information extracted from the documents 45. The display and visualization 44 can also generate a graphical representation which preserves independent variable relationships, such as described in common-assigned U.S. Pat. No. 6,888,548, issued May 3, 2005, the disclosure of which is incorporated by reference.

During text analysis, the text analyzer 42 identifies terms and phrases and extracts concepts in the form of noun phrases that are stored in a lexicon 18 maintained in the database 30. After normalizing the extracted concepts, the text analyzer 42 generates a frequency table 47 of concept occurrences, as further described below with reference to FIG. 6, and a matrix 48 of summations of the products of pair-wise terms, as further described below with reference to FIG. 10. The cluster 43 generates logical clusters 49 of documents in a multi-dimensional concept space for modeling semantic meaning. Similarly, the display and visualization 44 generates a histogram 50 of concept occurrences per document, as further described below with reference to FIG. 6, and a corpus graph 51 of concept occurrences over all documents, as further described below with reference to FIG. 8.

Each module is a computer program, procedure or module written as source code in a conventional programming language, such as the C++ programming language, and is presented for execution by the CPU as object or byte code, as is known in the art. The various implementations of the source code and object and byte codes can be held on a computer-readable storage medium or embodied on a transmission medium in a carrier wave. The document analyzer 12 operates in accordance with a sequence of process steps, as further described below with reference to FIG. 5.

Figure 3:
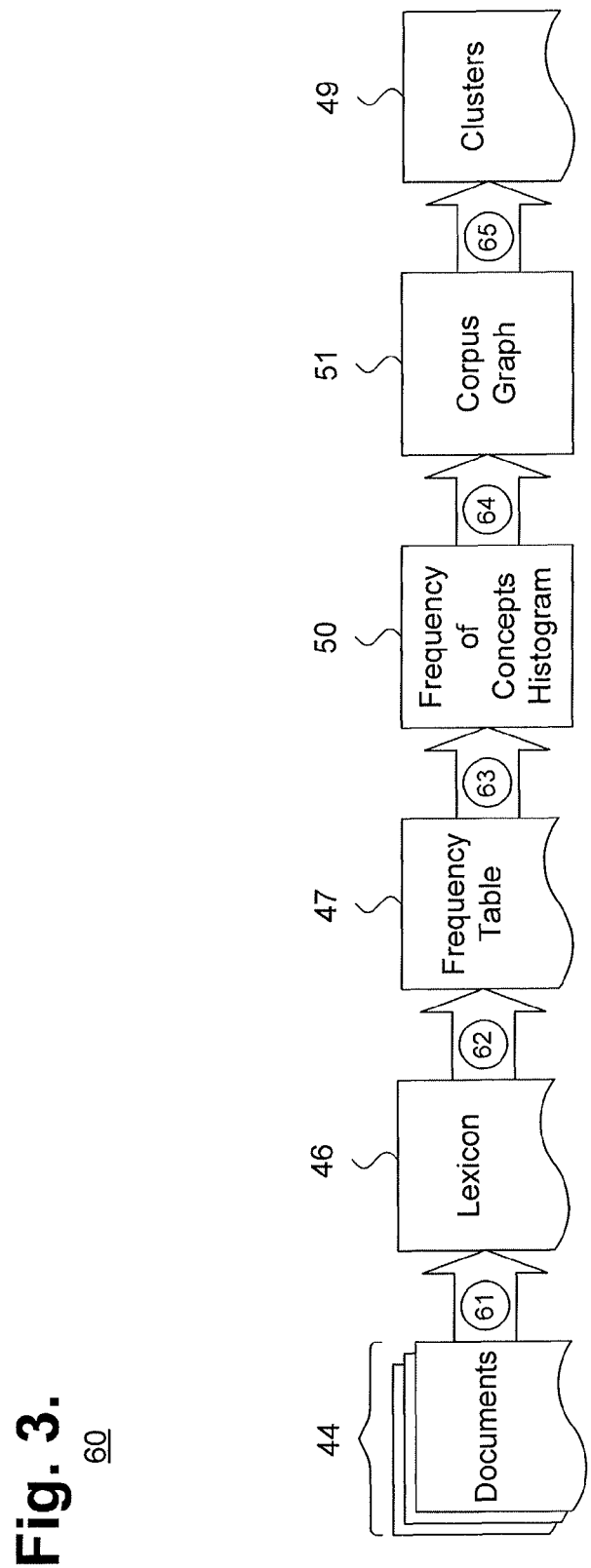
FIG. 3 is a process flow diagram showing the stages of text analysis performed by the document analyzer of FIG. 1.

FIG. 3 is a process flow diagram showing the stages 60 of text analysis performed by the document analyzer 12 of FIG. 1. The individual documents 45 are preprocessed and noun phrases are extracted as concepts (transition 61) into a lexicon 46. The noun phrases are normalized and queried (transition 62) to generate a frequency table 47. The frequency table 47 identifies individual concepts and their respective frequency of occurrence within each document 45. The frequencies of concept occurrences are visualized (transition 63) into a frequency of concepts histogram 50. The histogram 50 graphically displays the frequencies of occurrence of each concept on a per-document basis. Next, the frequencies of concept occurrences for all the documents 45 are assimilated (transition 64) into a corpus graph 51 that displays the overall counts of documents containing each of the extracted concepts. Finally, the most highly correlated terms and phrases from the extracted concepts are categorized (transition 65) into clusters 49.

Figure 4:
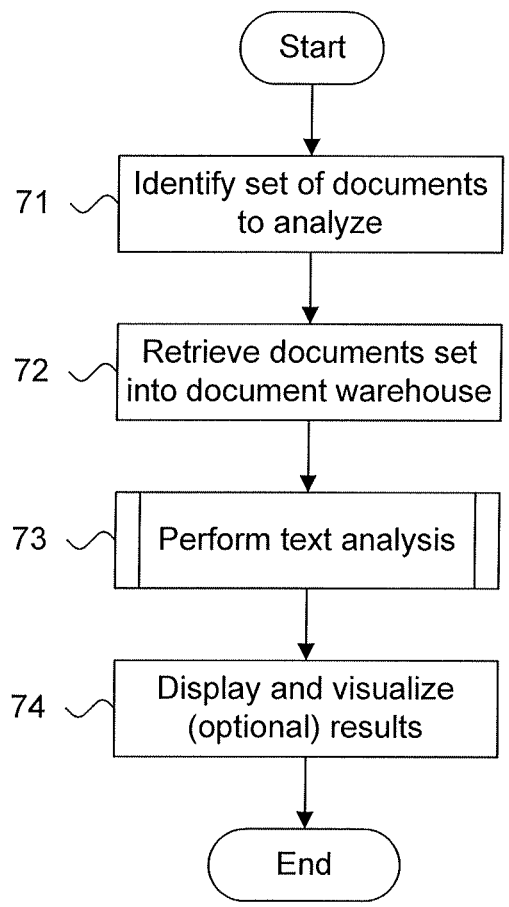
FIG. 4 is a flow diagram showing a method for efficiently generating cluster groupings in a multi-dimensional concept space, in accordance with the present invention.

FIG. 4 is a flow diagram showing a method 70 for efficiently generating cluster groupings in a multi-dimensional concept space 44 (shown in FIG. 2), in accordance with the present invention. As a preliminary step, the set of documents 45 to be analyzed is identified (block 71) and retrieved into the document warehouse 14 (shown in FIG. 1) (block 72). The documents 45 are unstructured data and lack a common format or shared type. The documents 45 include electronic messages stored in messaging folders, word processing documents, hypertext documents, and the like.

Once identified and retrieved, the set of documents 45 is analyzed (block 73), as further described below with reference to FIG. 5. During text analysis, a matrix 48 (shown in FIG. 2) of term-document association data is constructed to summarize the semantic content inherent in the structure of the documents 45. The semantic content is represented by groups of clusters of highly correlated documents generated through k-means clustering. As well, the frequency of individual terms or phrases extracted from the documents 45 are displayed and the results, including the clusters 43, are optionally visualized (block 74), as further described below with reference to FIG. 14. The routine then terminates.

Figure 5:
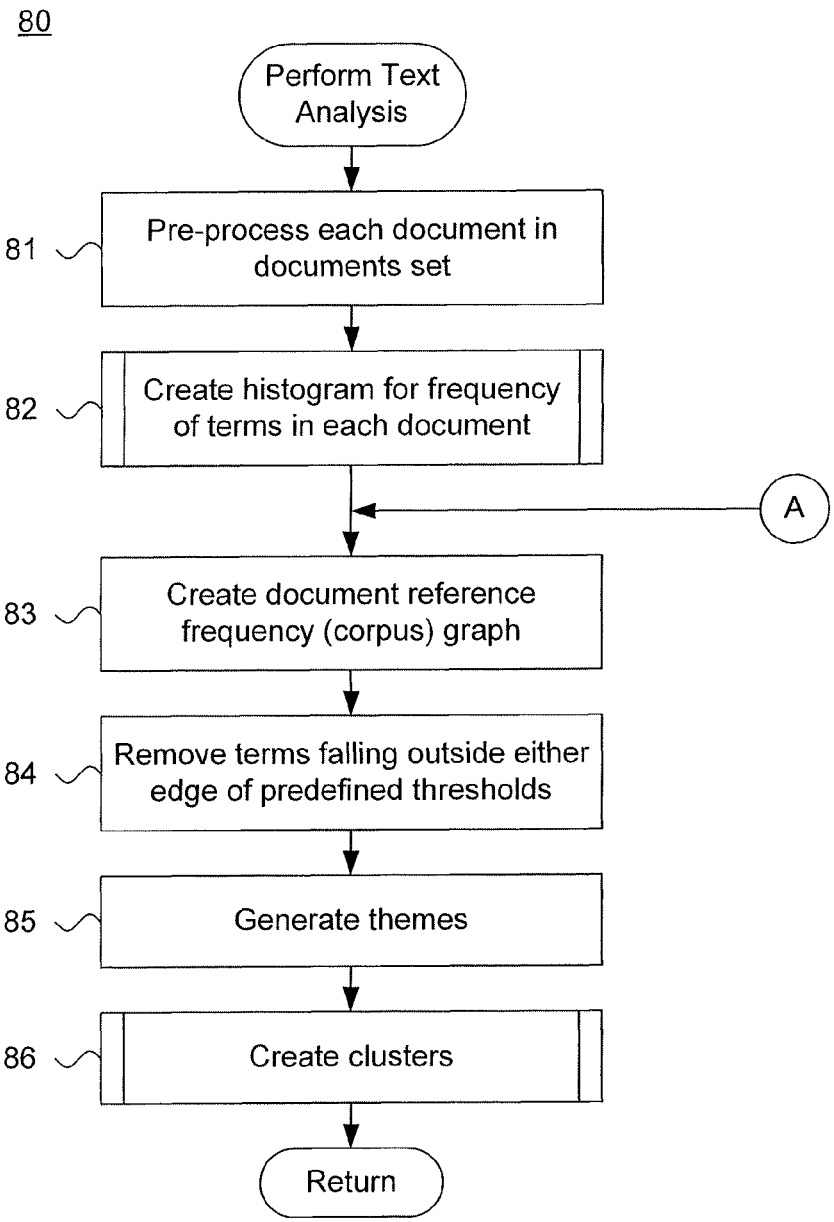
FIG. 5 is a flow diagram showing the routine for performing text analysis for use in the method of FIG. 4.

FIG. 5 is a flow diagram showing the routine 80 for performing text analysis for use in the method 70 of FIG. 4. The purpose of this routine is to extract and index terms or phrases for the set of documents 45 (shown in FIG. 2). Preliminarily, each document in the documents set 44 is preprocessed (block 81) to remove stop words. These include commonly occurring words, such as indefinite articles ("a" and "an"), definite articles ("the"), pronouns ("I", "he" and "she"), connectors ("and" and "or"), and similar non-substantive words.

Following preprocessing, a histogram 50 of the frequency of terms (shown in FIG. 2) is logically created for each document 45 (block 82), as further described below with reference to FIG. 6. Each histogram 50, as further described below with reference to FIG. 9, maps the relative frequency of occurrence of each extracted term on a per-document basis.

Figures 9, 10:
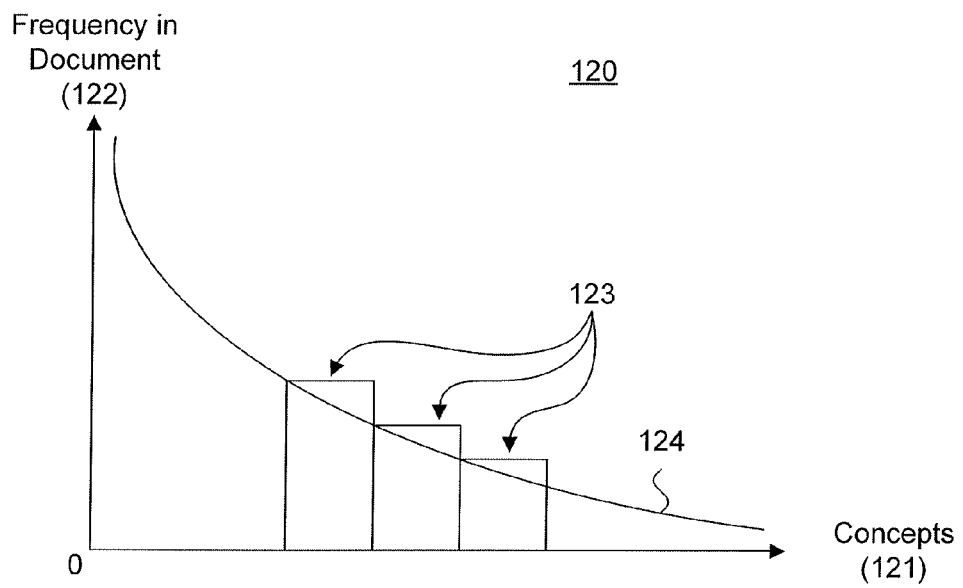
FIG. 9 is a graph showing, by way of example, a histogram of the frequencies of concept occurrences generated by the routine of FIG. 6.
FIG. 10 is a table showing, by way of example, concept occurrence frequencies generated by the routine of FIG. 6.

Next, a document reference frequency (corpus) graph 51, as further described below with reference to FIG. 10, is created for all documents 45 (block 83). The corpus graph 51 graphically maps the semantically-related concepts for the entire documents set 44 based on terms and phrases. A subset of the corpus is selected by removing those terms and phrases falling outside either edge of predefined thresholds (block 84). For shorter documents, such as email, having less semantically-rich content, the thresholds are set from about 1% to about 15%, inclusive. Larger documents may require tighter threshold values.

The selected set of terms and phrases falling within the thresholds are used to generate themes (and concepts) (block 85) based on correlations between normalized terms and phrases in the documents set. In the described embodiment, themes are primarily used, rather than individual concepts, as a single co-occurrence of terms or phrases carries less semantic meaning than multiple co-occurrences. As used herein, any reference to a "theme" or "concept" will be understood to include the other term, except as specifically indicated otherwise.

Next, clusters of concepts and themes are created (block 86) from groups of highly-correlated terms and phrases, as further described below with reference to FIG. 12. The routine then returns.

Figure 6:
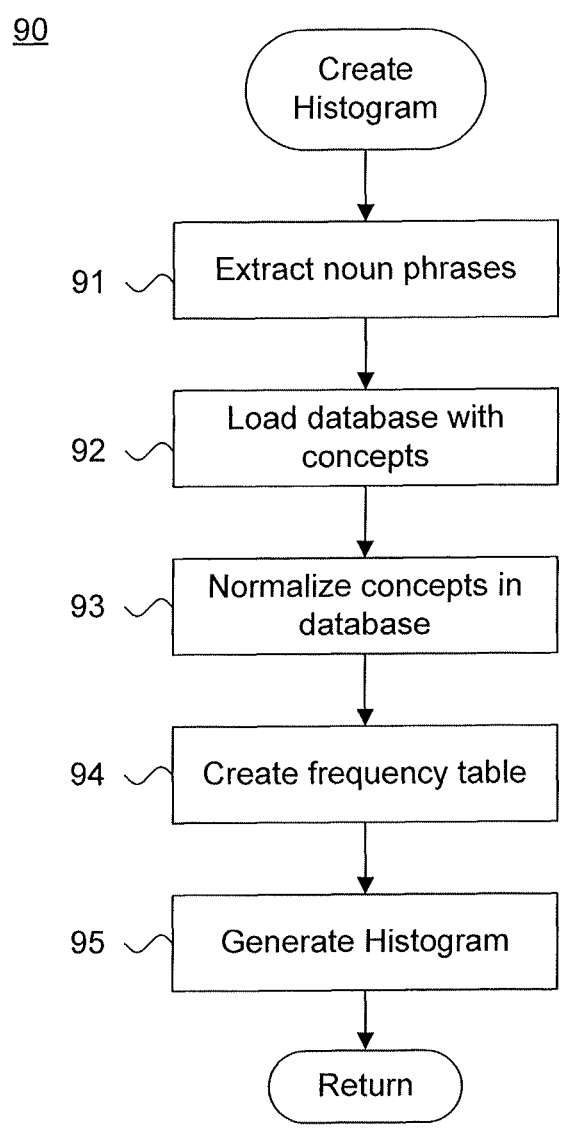
FIG. 6 is a flow diagram showing the routine for creating a histogram for use in the routine of FIG. 5.

FIG. 6 is a flow diagram showing the routine 90 for creating a histogram 50 (shown in FIG. 2) for use in the routine of FIG. 5. The purpose of this routine is to extract noun phrases representing individual concepts and to create a normalized representation of the occurrences of the concepts on a per-document basis. The histogram represents the logical union of the terms and phrases extracted from each document. In the described embodiment, the histogram 48 need not be expressly visualized, but is generated internally as part of the text analysis process.

Initially, noun phrases are extracted (block 91) from each document 45. In the described embodiment, concepts are defined on the basis of the extracted noun phrases, although individual nouns or tri-grams (word triples) could be used in lieu of noun phrases. In the described embodiment, the noun phrases are extracted using the LinguistX product licensed by Inxight Software, Inc., Santa Clara, Calif.

Once extracted, the individual terms or phrases are loaded into records stored in the database 30 (shown in FIG. 1) (block 92). The terms stored in the database 30 are normalized (block 93) such that each concept appears as a record only once. In the described embodiment, the records are normalized into third normal form, although other normalization schemas could be used.

Figure 7:
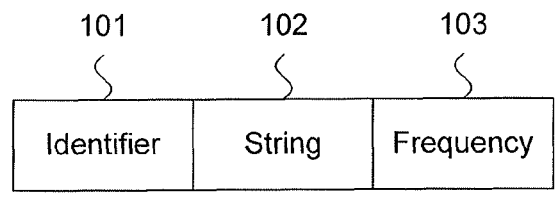
FIG. 7 is a data structure diagram showing a database record for a concept stored in the database 30 of FIG. 1.

FIG. 7 is a data structure diagram showing a database record 100 for a concept stored in the database 30 of FIG. 1. Each database record 100 includes fields for storing an identifier 101, string 102 and frequency 103. The identifier 101 is a monotonically increasing integer value that uniquely identifies each term or phrase stored as the string 102 in each record 100. The frequency of occurrence of each term or phrase is tallied in the frequency 103.

Figure 8:
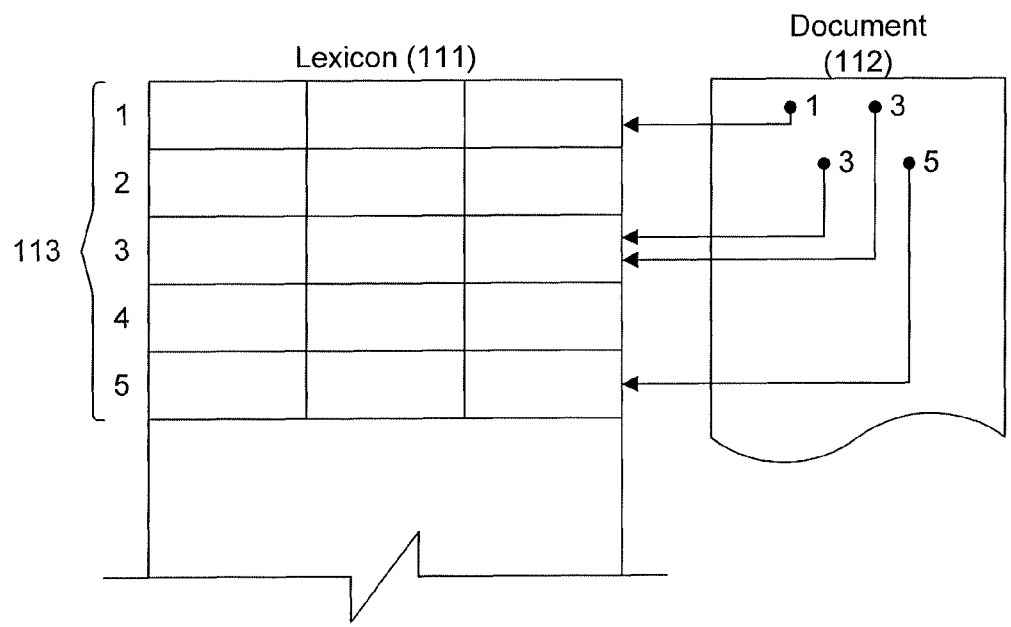
FIG. 8 is a data structure diagram showing, by way of example, a database table containing a lexicon of extracted concepts stored in the database 30 of FIG. 1.

FIG. 8 is a data structure diagram showing, by way of example, a database table 110 containing a lexicon 111 of extracted concepts stored in the database 30 of FIG. 1. The lexicon 111 maps out the individual occurrences of identified terms 113 extracted for any given document 112. By way of example, the document 112 includes three terms numbered 1, 3 and 5. Concept 1 occurs once in document 112, concept 3 occurs twice, and concept 5 occurs once. The lexicon tallies and represents the occurrences of frequency of the concepts 1, 3 and 5 across all documents 45.

Referring back to FIG. 6, a frequency table is created from the lexicon 111 for each given document 45 (block 94). The frequency table is sorted in order of decreasing frequencies of occurrence for each concept 113 found in a given document 45. In the described embodiment, all terms and phrases occurring just once in a given document are removed as not relevant to semantic content. The frequency table is then used to generate a histogram 50 (shown in FIG. 2) (block 95) which visualizes the frequencies of occurrence of extracted concepts in each document. The routine then returns.

FIG. 9 is a graph showing, by way of example, a histogram 50 of the frequencies of concept occurrences generated by the routine of FIG. 6. The x-axis defines the individual concepts 121 for each document and the y-axis defines the frequencies of occurrence of each concept 122. The concepts are mapped in order of decreasing frequency 123 to generate a curve 124 representing the semantic content of the document 45. Accordingly, terms or phrases appearing on the increasing end of the curve 124 have a high frequency of occurrence while concepts appearing on the descending end of the curve 124 have a low frequency of occurrence.

FIG. 10 is a table 130 showing, by way of example, concept occurrence frequencies generated by the routine of FIG. 6. Each concept 131 is mapped against the total frequency occurrence 132 for the entire set of documents 45. Thus, for each of the concepts 133, a cumulative frequency 134 is tallied. The corpus table 130 is used to generate the document concept frequency reference (corpus) graph 51.

Figures 11, 13:
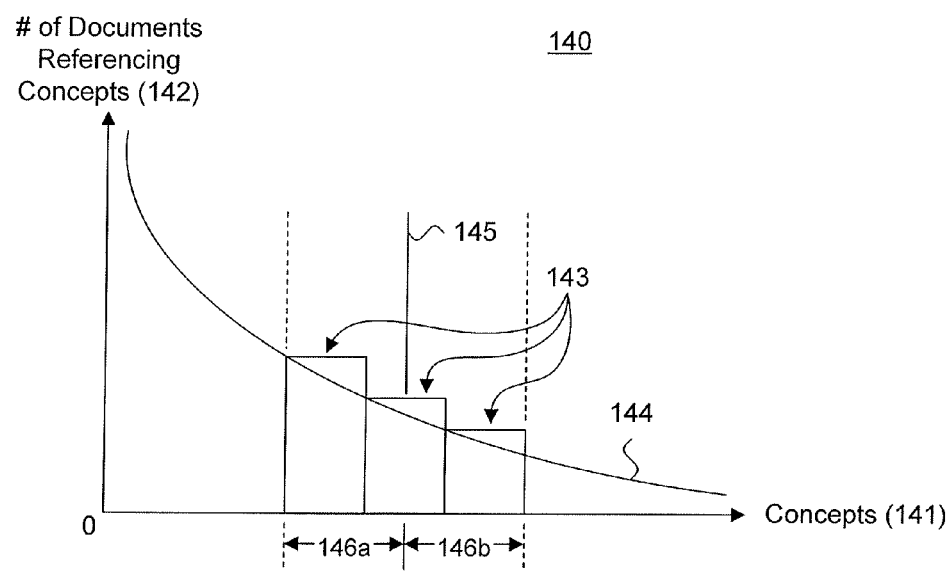
FIG. 11 is a graph showing, by way of example, a corpus graph of the frequency of concept occurrences generated by the routine of FIG. 5.
FIG. 13 is a table showing, by way of example, the concept clusters created by the routine for FIG. 12.

FIG. 11 is a graph 140 showing, by way of example, a corpus graph of the frequency of concept occurrences generated by the routine of FIG. 5. The graph 140 visualizes the extracted concepts as tallied in the corpus table 130 (shown in FIG. 10). The x-axis defines the individual concepts 141 for all documents and the y-axis defines the number of documents 45 referencing each concept 142. The individual concepts are mapped in order of descending frequency of occurrence 143 to generate a curve 144 representing the latent semantics of the set of documents 45.

A median value 145 is selected and edge conditions 146a-b are established to discriminate between concepts which occur too frequently versus concepts which occur too infrequently. Those documents falling within the edge conditions 146a-b form a subset of documents containing latent concepts. In the described embodiment, the median value 145 is document-type dependent. For efficiency, the upper edge condition 146b is set to 70% and the 64 concepts immediately preceding the upper edge condition 146b are selected, although other forms of threshold discrimination could also be used.

Figure 12:
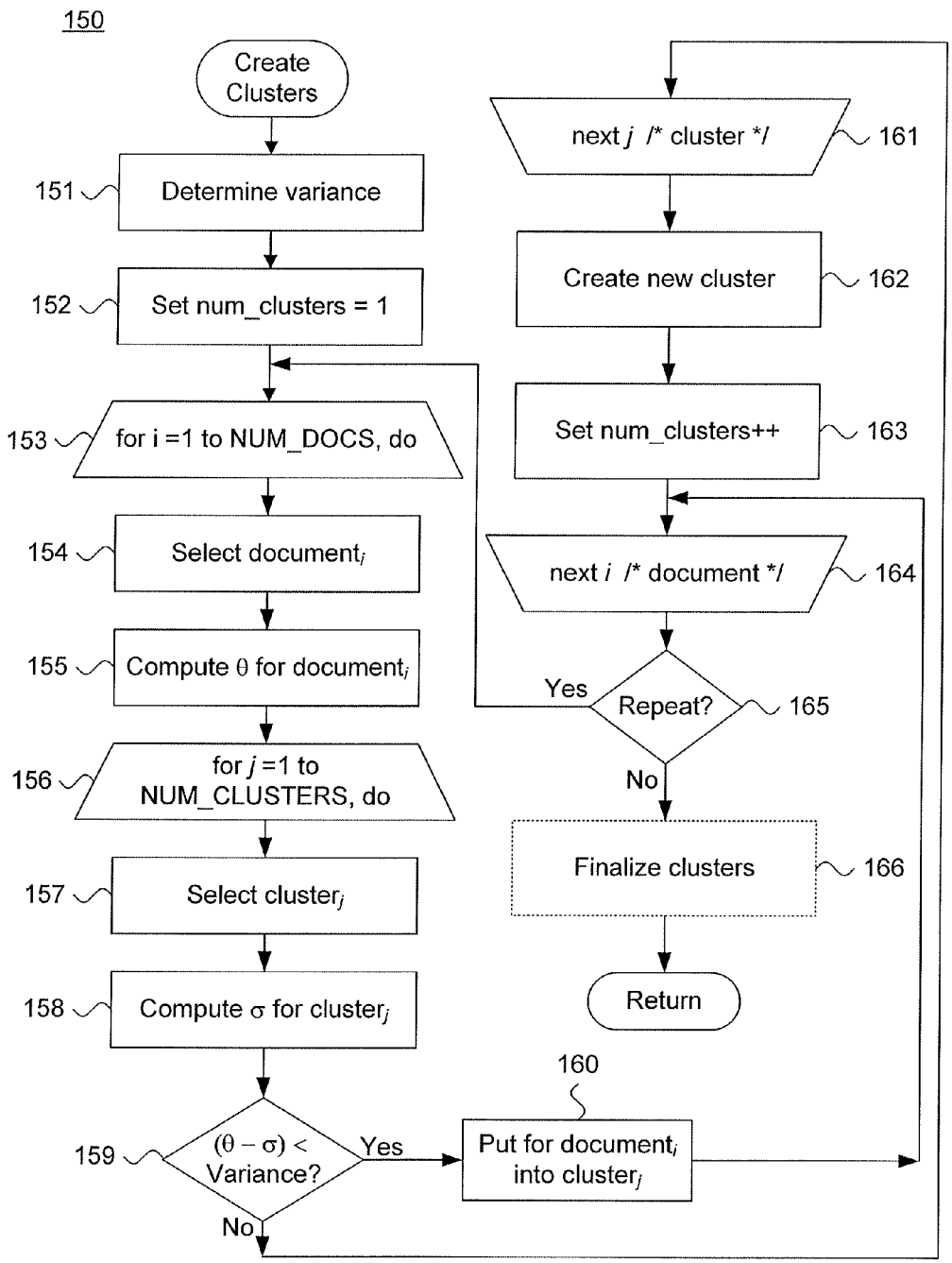
FIG. 12 is a flow diagram showing the routine for creating clusters for use in the routine of FIG. 5.

FIG. 12 is a flow diagram 150 showing the routine for creating clusters for use in the routine of FIG. 5. The purpose of this routine is to build a concept space over a document collection consisting of clusters 49 (shown in FIG. 2) of individual documents having semantically similar content. Initially, a single cluster is created and additional clusters are added using a k-mean clustering technique, as required by the document set. Those clusters falling outside a pre-determined variance are grouped into new clusters, such that every document in the document set appears in at least one cluster and the concepts and themes contained therein are distributed over a meaningful range of clusters. The clusters are then visualized as a data representation, as further described below with reference to FIG. 14.

Each cluster consists of a set of documents that share related terms and phrases as mapped in a multi-dimensional concept space. Those documents having identical terms and phrases mapped to a single cluster located along a vector at a distance (magnitude) d measured at an angle θ from a common origin relative to the multi-dimensional concept space. Accordingly, a Euclidean distance between the individual concepts can be determined and clusters created.

Initially, a variance specifying an upper bound on Euclidean distances in the multi-dimensional concept space is determined (block 151). In the described embodiment, a variance of five percent is specified, although other variance values, either greater or lesser than five percent, could be used as appropriate to the data profile. As well, an internal counter num_clusters is set to the initial value of 1 (block 152).

The documents and clusters are iteratively processed in a pair of nested processing loops (blocks 153-164 and 156-161). During each iteration of the outer processing loop (blocks 153-164), each document i is processed (block 153) for every document in the document set. Each document i is first selected (block 154) and the angle θ relative to a common origin is computed (block 155).

During each iterative loop of the inner processing loop (block 156-161), the selected document i is compared to the existing set of clusters. Thus, a cluster j is selected (block 157) and the angle σ relative to the common origin is computed (block 158). Note the angle σ must be recomputed regularly for each cluster j as documents are added or removed. The difference between the angle θ for the document i and the angle σ for the cluster j is compared to the predetermined variance (block 159). If the difference is less than the predetermined variance (block 159), the document i is put into the cluster j (block 160) and the iterative processing loop (block 156-161) is terminated. If the difference is greater than or equal to the variance (block 159), the next cluster j is processed (block 161) and processing continues for each of the current clusters (blocks 156-161).

If the difference between the angle θ for the document i and the angle σ for each of the clusters exceeds the variance, a new cluster is created (block 162) and the counter num_clusters is incremented (block 163). Processing continues with the next document i (block 164) until all documents have been processed (blocks 153-164). The categorization of clusters is repeated (block 165) if necessary. In the described embodiment, the cluster categorization (blocks 153-164) is repeated at least once until the set of clusters settles. Finally, the clusters can be finalized (block 165) as an optional step. Finalization includes merging two or more clusters into a single cluster, splitting a single cluster into two or more clusters, removing minimal or outlier clusters, and similar operations, as would be recognized by one skilled in the art. The routine then returns.

FIG. 13 is a table 180 showing, by way of example, the concept clusters created by the routine 150 of FIG. 12. Each of the concepts 181 should appear in at least one of the clusters 182, thereby insuring that each document appears in some cluster. The Euclidean distances 183*a-d* between the documents for a given concept are determined. Those Euclidean distances 183*a-d* falling within a predetermined variance are assigned to each individual cluster 184-186. The table 180 can be used to visualize the clusters in a multi-dimensional concept space.

Figure 14:
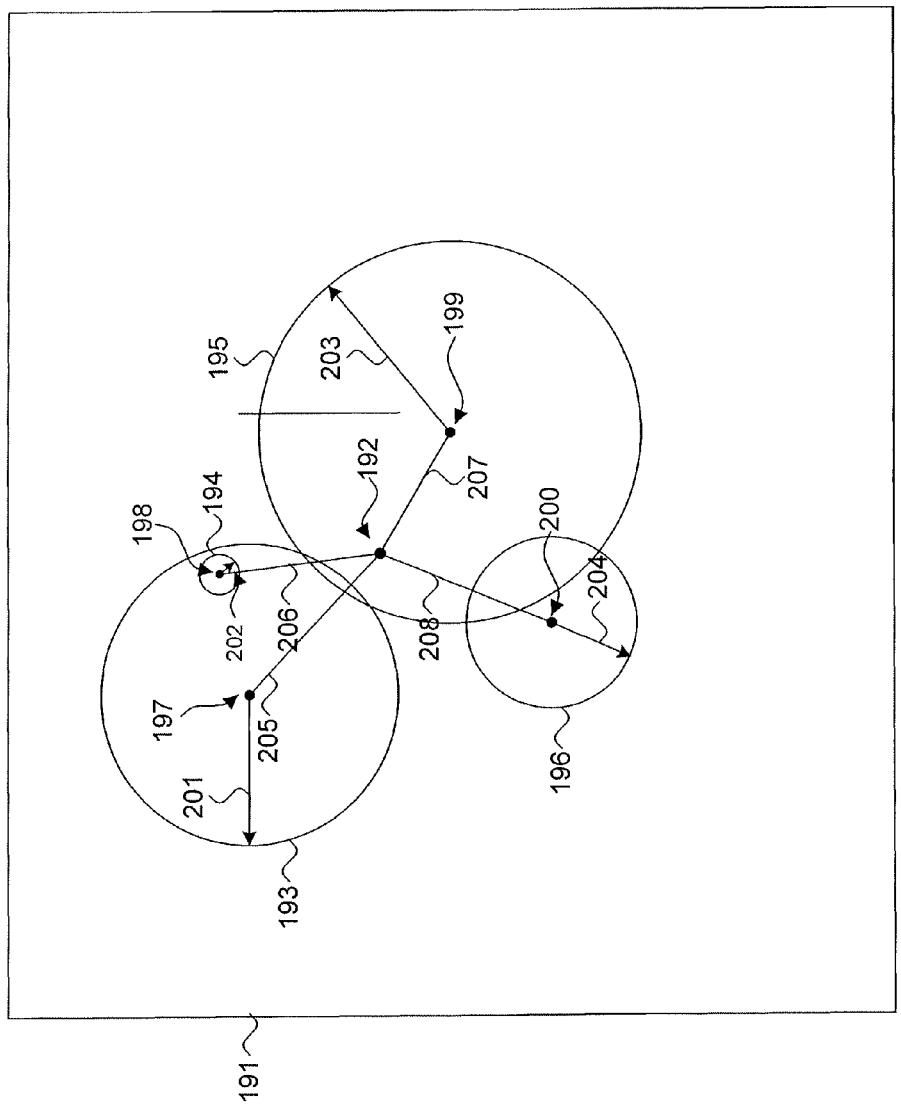
FIG. 14 is a data representation diagram showing, by way of example, a view of overlapping cluster generated by the system of FIG. 1.

FIG. 14 is a data representation diagram 14 showing, by way of example, a view 191 of overlapping clusters 193-196 generated by the system of FIG. 1. Each cluster 193-196 has a center c 197-200 and radius r 201-204, respectively, and is oriented around a common origin 192. The center c of each cluster 193-196 is located at a fixed distance d 205-208 from the common origin 192. Cluster 194 overlays cluster 193 and clusters 193, 195 and 196 overlap.

Each cluster 193-196 represents multi-dimensional data modeled in a three-dimensional display space. The data could be visualized data for a virtual semantic concept space, including semantic content extracted from a collection of documents represented by weighted clusters of concepts, such as described in commonly-assigned U.S. Pat. No. 6,978, 274, issued Dec. 20, 2005, the disclosure of which is incorporated by reference.

For each cluster 193, the radii r 201-204 and distances d 197-200 are independent variables relative to the other clusters 194-196 and the radius r 201 is an independent variable relative to the common origin 192. In this example, each cluster 193-196 represents a grouping of points corresponding to documents sharing a common set of related terms and phrases. The radii 201-204 of each cluster 193-196 reflect the relative number of documents contained in each cluster. Those clusters 193-197 located along the same vector are similar in theme as are those clusters located on vectors having a small cosign rotation from each other. Thus, the angle θ relative to a common axis' distance from a common origin 192 is an independent variable within a correlation between the distance d and angle θ relative similarity of theme. Although shown with respect to a circular shape, each cluster 193-196 could be non-circular. At a minimum, however, each cluster 193-196 must have a center of mass and be oriented around the common origin 192 and must define a convex volume. Accordingly, other shapes defining each cluster 193-196 are feasible.

While the invention has been particularly shown and described as referenced to the embodiments thereof, those skilled in the art will understand that the foregoing and other changes in form and detail may be made therein without departing from the spirit and scope of the invention.

What is claimed is:

1. A computer-implemented system for generating document clusters, comprising:
   clusters of documents in a multi-dimensional concept space;
   a selection module select at least one document from a collection of documents to be clustered;
   a document angle module to compute an angle θ of the document relative to a common origin of the multi-dimensional concept space;
   a comparison to compare the selected document with each of the clusters, comprising:
      a cluster angle module to calculate for each cluster, an angle σ from the common origin
      a similarity module to determine a difference between the angle θ of the document and the angle σ of the cluster; and
      a variance determining module to apply a variance the difference; and
   a cluster module to create a new cluster when the difference exceeds the variance for all the clusters.

2. A system according to claim 1, further comprising:
   a display placement module to place the selected document into one of the clusters when the difference between the selected document and that cluster is at least one of greater than or equal to the variance.

3. A system according to claim 1, further comprising:
   a cluster finalizing module to finalize one or more of the clusters comprising at least one of merging two or more of the clusters into a single cluster, splitting at least one of the clusters into two or more clusters, and removing those clusters that are outliers in relation to the remaining clusters.

4. A system according to claim 1, further comprising:
   a concept module to build a concept space over the document collection based on the clusters and any newly generated clusters.

5. A system according to claim 1, further comprising:
   a cluster formation module to form the clusters of documents in the multi-dimensional concept space by creating an initial cluster and adding additional clusters via a k-means clustering technique.

6. A system according to claim 1, wherein the documents are iteratively compared with the collection to the clusters.

7. A system according to claim 1, further comprising:
   a display module to place one or more of the clusters into the multi-dimensional concept space around the common origin.

8. A system according to claim 1, wherein the documents within each cluster share related terms and phrases.

9. A system according to claim 1, wherein the variance is defined as an upper bound on a distance between the documents and the clusters.

10. A system according to claim 1, further comprising:
an update module to recalculate the angle σ for each cluster when one of the documents is added or one of the documents is removed.

11. A computer-implemented method for generating document clusters, comprising:
presenting clusters of documents in a multi-dimensional concept space and selecting at least one document from a collection of documents to be clustered;
computing an angle θ of the document relative to a common origin of the multi-dimensional concept space;
comparing the selected document with each of the clusters, comprising:
calculating for each cluster, an angle σ from the common origin;
determining a difference between the angle θ for the document and the angle σ for the cluster; and
comparing the difference to a variance; and
creating a new cluster when the difference exceeds the variance for all the clusters.

12. A method according to claim 11, further comprising:
placing the selected document into one or more of the clusters when the difference between the selected document and that cluster is at least one of greater than or equal to the variance.

13. A method according to claim 11, further comprising at least one of:
merging two or more of the clusters into a single cluster;
splitting at least one of the clusters into two or more clusters; and
removing those clusters that are outliers in relation to the remaining clusters.

14. A method according to claim 11, further comprising:
building a concept space over the document collection based on the clusters and any newly generated clusters.

15. A method according to claim 11, further comprising:
forming the clusters of documents in the multi-dimensional concept space, comprising:
creating an initial cluster; and
adding additional clusters via a k-means clustering technique.

16. A method according to claim 11, further comprising:
iteratively comparing each document in the collection to the clusters.

17. A method according to claim 11, further comprising:
placing one or more of the clusters into the multi-dimensional concept space around the common origin.

18. A method according to claim 11, wherein the documents within each cluster share related terms and phrases.

19. A method according to claim 11, further comprising:
defining the variance as an upper bound on a distance between the documents and the clusters.

20. A method according to claim 11, further comprising:
recalculating the angle σ for each cluster when one of the documents is added or one of the documents is removed.

* * * * *